(12) United States Patent
Mäker et al.

(10) Patent No.: US 10,253,236 B2
(45) Date of Patent: Apr. 9, 2019

(54) ENVIRONMENTAL FRIENDLY WELL TREATMENT FLUIDS COMPRISING AN ESTER

(71) Applicant: AMRIL AG, Zug (CH)

(72) Inventors: Diana Mäker, Mettmann (DE); Heinz Müller, Monheim (DE)

(73) Assignee: AMRIL AG, Zug (CH)

( * ) Notice: Subject to any disclaimer, the term of this patent is extended or adjusted under 35 U.S.C. 154(b) by 278 days.

(21) Appl. No.: 14/916,229

(22) PCT Filed: Oct. 31, 2013

(86) PCT No.: PCT/EP2013/072803
§ 371 (c)(1),
(2) Date: Mar. 3, 2016

(87) PCT Pub. No.: WO2015/062656
PCT Pub. Date: May 7, 2015

(65) Prior Publication Data
US 2016/0230069 A1    Aug. 11, 2016

(51) Int. Cl.
| | |
|---|---|
| *C09K 8/06* | (2006.01) |
| *C09K 8/035* | (2006.01) |
| *C09K 8/54* | (2006.01) |
| *C23F 11/10* | (2006.01) |
| *C23F 11/12* | (2006.01) |
| *C11D 1/58* | (2006.01) |
| *C09K 8/40* | (2006.01) |
| *C09K 8/68* | (2006.01) |
| *C09K 8/86* | (2006.01) |

(52) U.S. Cl.
CPC .............. *C09K 8/06* (2013.01); *C09K 8/035* (2013.01); *C09K 8/40* (2013.01); *C09K 8/54* (2013.01); *C09K 8/68* (2013.01); *C09K 8/86* (2013.01); *C11D 1/58* (2013.01); *C23F 11/10* (2013.01); *C23F 11/128* (2013.01); *C09K 2208/32* (2013.01)

(58) Field of Classification Search
CPC ...... C09K 2208/32; C09K 8/035; C09K 8/06; C09K 8/40; C09K 8/54; C09K 8/68; C09K 8/86; C11D 1/58; C23F 11/10; C23F 11/128
See application file for complete search history.

(56) References Cited

U.S. PATENT DOCUMENTS

| | | |
|---|---|---|
| 3,127,345 A | 3/1964 | Kamitaki et al. |
| 4,113,498 A | 9/1978 | Rones et al. |
| 5,106,516 A | 4/1992 | Mueller et al. |
| 5,194,422 A | 3/1993 | Mueller et al. |
| 5,252,554 A | 10/1993 | Mueller et al. |
| 5,254,531 A | 10/1993 | Mueller et al. |
| 5,318,954 A | 6/1994 | Mueller et al. |
| 5,318,956 A | 6/1994 | Mueller et al. |
| 5,348,938 A | 9/1994 | Mueller et al. |
| 5,403,822 A | 4/1995 | Mueller et al. |
| 5,441,927 A | 8/1995 | Mueller et al. |
| 5,461,028 A | 10/1995 | Mueller et al. |
| 5,663,122 A | 9/1997 | Mueller et al. |
| 5,755,892 A | 5/1998 | Herold et al. |
| 5,846,601 A | 12/1998 | Ritter et al. |
| RE36,066 E | 1/1999 | Mueller et al. |
| 5,869,434 A | 2/1999 | Mueller et al. |
| 6,022,833 A | 2/2000 | Mueller et al. |
| 6,122,860 A | 9/2000 | Von Tapavicza et al. |
| 6,165,946 A | 12/2000 | Mueller et al. |
| 6,289,989 B1 | 9/2001 | Mueller et al. |
| 6,350,788 B1 | 2/2002 | Herold et al. |
| 6,716,799 B1 | 4/2004 | Mueller et al. |
| 6,806,235 B1 | 10/2004 | Mueller et al. |
| 7,666,820 B2 | 2/2010 | Mueller et al. |
| 7,741,248 B2 | 6/2010 | Mueller et al. |
| 7,959,743 B2 | 6/2011 | Mueller et al. |
| 8,148,305 B2 | 4/2012 | Wesffechtel et al. |
| 8,153,562 B2 | 4/2012 | Muller et al. |
| 8,193,125 B2 | 6/2012 | Muller et al. |
| 8,236,735 B2 | 8/2012 | Maker et al. |
| 9,085,524 B2 | 7/2015 | Muller et al. |
| 2007/0027046 A1 | 2/2007 | Friend et al. |
| 2007/0122370 A1* | 5/2007 | Behler ............ A61K 8/39 424/70.13 |
| 2007/0219097 A1 | 9/2007 | Mueller et al. |
| 2008/0009422 A1* | 1/2008 | Patel .............. C09K 8/035 507/110 |
| 2008/0182910 A1* | 7/2008 | Qiu .................. A61K 8/06 516/21 |
| 2009/0229633 A1* | 9/2009 | Kabashima ........... C11D 7/28 134/11 |
| 2010/0258307 A1 | 10/2010 | Muller et al. |
| 2010/0294501 A1 | 11/2010 | Daute et al. |
| 2012/0252712 A1* | 10/2012 | Albers ............ C11D 1/825 510/191 |

(Continued)

FOREIGN PATENT DOCUMENTS

CA    2327422 A1    10/1999

OTHER PUBLICATIONS

International Search Report dated May 12, 2014 in PCT/EP2013/072803 (3 pages).

*Primary Examiner* — Alicia Bland
(74) *Attorney, Agent, or Firm* — Philip P. McCann; Nexsen Pruet, PLLC

(57) ABSTRACT

The present invention relates to environmental friendly well treatment fluids comprising water and/or an organic phase and an ester obtainable by reacting a polycarboxylic acid with a hydroxy monocarboxylic acid. The invention also relates to the use of said ester as viscosifier and/or corrosion inhibitor for a well treatment fluid and preferably for a well treatment fluid for offshore well drilling.

15 Claims, No Drawings

(56) References Cited

U.S. PATENT DOCUMENTS

| | | | |
|---|---|---|---|
| 2012/0322950 A1* | 12/2012 | Haberecht | C08G 63/6884 |
| | | | 525/447 |
| 2013/0190217 A1* | 7/2013 | Lammle | C10M 105/36 |
| | | | 508/496 |
| 2014/0048258 A1 | 2/2014 | Muller et al. | |
| 2014/0073539 A1* | 3/2014 | Maekawa | C09K 8/88 |
| | | | 507/219 |
| 2014/0147404 A1* | 5/2014 | Schaper | C11D 3/0068 |
| | | | 424/65 |
| 2015/0210914 A1 | 7/2015 | Muller et al. | |

* cited by examiner

ENVIRONMENTAL FRIENDLY WELL TREATMENT FLUIDS COMPRISING AN ESTER This application is a national stage application under 35 U.S.C. § 371 of International Application No. PCT/EP2013/072803 filed 31 Oct. 2013, the disclosure of which is expressly incorporated herein by reference.

The present invention relates to environmental friendly well treatment fluids comprising water and/or an organic phase and an ester obtainable by reacting a polycarboxylic acid with a hydroxy monocarboxylic acid. The invention also relates to the use of said ester as viscosifier and/or corrosion inhibitor for a well treatment fluid and preferably for a well treatment fluid for offshore well drilling.

BACKGROUND OF THE INVENTION

The present invention relates to novel well treatment fluids comprising improved additives. Particularly desirable are well treatment fluids having an improved biodegradability since a significant part of these fluids generally comes into contact with the environment.

The term "well treatment fluid" used herein includes, but is not limited to fluids used in the drilling of bore holes in rock to lubricate and cool drill bits, and to transport rock cuttings away from the rock face. The term includes "drilling fluids", "spacer fluids" and "fracturing fluids". Space fluids are used to clean the sides of bore holes prior to cementing. Drilling fluids are used in the construction of deep wells and bore holes, and especially oil and gas wells. During the drilling of oil and gas wells, drilling fluid is typically circulated in the well bore to cool and lubricate the drill bit and pipe, to carry cuttings from the bottom of the well bore to the surface, and to impose a hydrostatic head on the drilled formation to prevent the escape of oil, gas, or water from the well bore. Also, the term well treatment fluid as used herein embraces "completion muds" or "completion fluids", which are preferably used in civil engineering and the construction industry to stabilize holes and excavations by preventing the breakdown of shales on exposure to water. The term well treatment fluid is also used herein to include "packing fluids" which are used in drilling operations to fill the space between concentric, downhole tubing used in the well casing. The term "well treatment fluid" also includes "drill-in" fluids and "workover fluids". A "drill-in" fluid is generally a drilling fluid used to drill the well bore into producing portions of a subterranean formation so as to minimize damage, maximize production of exposed zones, and facilitate any necessary well completion needed. A drill-in fluid generally contains fewer solids than a drilling fluid, and what solids it does contain are often size controlled to minimize penetration or invasion into the formation matrix to avoid damaging the production formation. Preferably, the term "well treatment fluid" is a fluid selected from the group consisting of drilling fluid, drill-in fluid, completion fluid, fracturing fluid and workover fluid.

In addition, the well treatment fluid of the invention is useful as a spearhead fluid for the removal of unwanted deposits or hydrocarbons prior to the introduction of a stimulation (or other well treatment) fluid.

For various applications it is desirable to be able to adjust the viscosity of well treatment fluids. For this purpose viscosifier additives can be included. Also it may be necessary to add corrosion inhibitors to protect metal parts of machinery from corrosion if the parts come into contact with the well treatment fluids and/or with other fluids and gases from the well.

It is important that the additives used in well treatment fluids are ideally non-toxic or have only a low toxicity since as mentioned the well treatment fluids will be contact with the environment. For offshore drilling operations it is particularly advantageous if the well treatment fluids and additives therefore exhibit particularly low levels of toxicity towards marine microbial life forms also since these microorganisms enter into the food chain of larger life forms and are critical to maintain a stable ecosystem.

However, well treatment fluids for stimulation and remediation as well as fluids for removing drilling muds from the wellbore, for example prior to cementing or introduction of a completion brine, or for other purposes and additives therefore such as viscosifiers and corrosion inhibitors presently used are either not biodegradable or are less efficacious than required.

Thus, in particular for demanding applications there is a continued need for more effective well treatment fluids and additives therefore, which are at the same time characterized by a an improved biodegradability and low toxicity.

It was therefore an object of the invention to provide novel well treatment fluids and additives therefore which meet this demand.

SUMMARY OF THE INVENTION

To solve the aforementioned problems, the present invention provides novel esters comprising at least one free carboxylic acid group useful as additives for well treatment fluids and well treatment fluids comprising said esters. The esters of the invention have been shown to show good performance as viscosifier for well treatment fluids such as drilling muds, work over fluids, completion fluids etc. Furthermore, an ester additive according to the present invention will also provide corrosion inhibition effects which are welcome in this kind of application. In addition, surprisingly, the esters of the invention show superior biocompatibility since the product is effectively biodegradable.

In particular the invention provides a well treatment fluid comprising
(i) an ester obtainable by reacting
   (a) a polycarboxylic acid with
   (b) a hydroxy monocarboxylic acid; and
(ii) water and/or an organic phase.

A further aspect of the invention relates to the use of an ester as defined under (i) above as additive for a well treatment fluid and preferably for a well treatment fluid for offshore well drilling. Preferably said ester is used according to the invention as viscosifier and/or corrosion inhibitor in said well treatment fluid.

DETAILED DESCRIPTION OF THE INVENTION

Before the present invention is described in detail below, it is to be understood that this invention is not limited to the particular methodology, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Some documents are cited throughout the text of this specification. Each of the documents cited herein (including all patents, patent applications, scientific publications, manufacturer's specifications, instructions, DIN norms etc.), whether supra or infra, are hereby incorporated by reference in their entirety. Nothing herein is to be construed as an admission that the invention is not entitled to antedate such disclosure by virtue of prior invention.

In the following definitions of some chemical terms are provided. These terms will in each instance of its use in the remainder of the specification have the respectively defined meaning and preferred meanings.

The term "alkyl" refers to a saturated straight or branched carbon chain. Preferably, an alkyl as used herein is a $C_1$-$C_{20}$ alkyl and more preferably is a $C_1$-$C_{10}$ alkyl, i.e. having 1, 2, 3, 4, 5, 6, 7, 8, 9 or 10 carbon atoms, e.g. is selected from methyl, ethyl, propyl, iso-propyl, butyl, iso-butyl, tert-butyl, pentyl or hexyl, heptyl, octyl, nonyl and decyl. Alkyl groups are optionally substituted.

The term "alcohol" refers to a compound having one or more hydroxyl groups. For example a $C_8$-$C_{36}$ alkyl alcohol is a $C_8$-$C_{36}$ alkyl substituted with one or more hydroxyl groups. The term "polyol" refers to an alcohol having at least two hydroxyl groups.

The term "heteroalkyl" refers to a saturated straight or branched carbon chain. Preferably, the chain comprises from 1 to 9 carbon atoms, i.e. 1, 2, 3, 4, 5, 6, 7, 8, 9 e.g. methyl, ethyl, propyl, iso-propyl, butyl, iso-butyl, sec-butyl, tert-butyl, pentyl or hexyl, heptyl, octyl, nonyl which is interrupted one or more times, e.g. 1, 2, 3, 4, 5, with the same or different heteroatoms. Preferably the heteroatoms are selected from O, S, and N, e.g. —O—$CH_3$, —S—$CH_3$, —$CH_2$—O—$CH_3$, —$CH_2$—O—$C_2H_5$, —$CH_2$—S—$CH_3$, —$CH_2$—S—$C_2H_5$, —$C_2H_4$—O—$C_3$, —$CH_2H_4$—O—$CH_2H_5$, —$C_2H_4$—S—$CH_3$, —$C_2H_4$—S—$C_2H_5$ etc. Heteroalkyl groups are optionally substituted.

The terms "cycloalkyl" and "heterocycloalkyl", by themselves or in combination with other terms, represent, unless otherwise stated, cyclic versions of "alkyl" and "heteroalkyl", respectively, with preferably 3, 4, 5, 6, 7, 8, 9 or 10 atoms forming a ring, e.g. cyclopropyl, cyclobutyl, cyclopentyl, cyclohexyl, cycloheptyl, cyclooctyl etc. The terms "cycloalkyl" and "heterocycloalkyl" are also meant to include bicyclic, tricyclic and polycyclic versions thereof. If more than one cyclic ring is present such as in bicyclic, tricyclic and polycyclic versions, then these rings may also comprise one or more aryl- or heteroaryl ring. The term "heterocycloalkyl" preferably refers to a saturated ring having five members of which at least one member is a N, O or S atom and which optionally contains one additional O or one additional N; a saturated ring having six members of which at least one member is a N, O or S atom and which optionally contains one additional O or one additional N or two additional N atoms; or a saturated bicyclic ring having nine or ten members of which at least one member is a N, O or S atom and which optionally contains one, two or three additional N atoms. "Cycloalkyl" and "heterocycloalkyl" groups are optionally substituted. Additionally, for heterocycloalkyl, a heteroatom can occupy the position at which the heterocycle is attached to the remainder of the molecule.

Preferred examples of cycloalkyl include cyclopropyl, cyclobutyl, cyclopentyl, cyclohexyl, cycloheptyl, cyclooctyl, cyclononyl, cyclodecyl, spiro[3,3]heptyl, spiro[3,4]octyl, spiro[4,3]octyl, spiro[3,5]nonyl, spiro[5,3]nonyl, spiro [3,6]decyl, spiro[6,3]decyl, spiro[4,5]decyl, spiro[5,4]decyl, bicyclo[4.1.0]heptyl, bicyclo[3.2.0]heptyl, bicyclo[2.2.1] heptyl, bicyclo[2.2.2]octyl, bicyclo[5.1.0]octyl, bicyclo [4.2.0]octyl, octahydro-pentalenyl, octahydro-indenyl, decahydro-azulenyl, adamantly, or decahydro-naphthalenyl. Examples of heterocycloalkyl include 1-(1,2,5,6-tetrahydropyridyl), 1-piperidinyl, 2-piperidinyl, 3-piperidinyl, 4-morpholinyl, 3-morpholinyl, 1,8 diaza-spiro-[4,5] decyl, 1,7 diaza-spiro-[4,5] decyl, 1,6 diaza-spiro-[4,5] decyl, 2,8 diaza-spiro[4,5] decyl, 2,7 diaza-spiro[4,5] decyl, 2,6 diaza-spiro[4,5] decyl, 1,8 diaza-spiro-[5,4] decyl, 1,7 diaza-spiro-[5,4] decyl, 2,8 diaza-spiro-[5,4] decyl, 2,7 diaza-spiro[5,4] decyl, 3,8 diaza-spiro[5,4] decyl, 3,7 diaza-spiro[5,4] decyl, 1-aza-7,11-dioxo-spiro [5,5] undecyl, 1,4-diazabicyclo [2.2.2] oct-2-yl, tetrahydrofuran-2-yl, tetrahydrofuran-3-yl, tetrahydrothien-2-yl, tetrahydrothien-3-yl, 1-piperazinyl, 2-piperazinyl, and the like.

The term "alicyclic system" refers to mono, bicyclic, tricyclic or polycyclic version of a cycloalkyl or heterocycloalkyl comprising at least one double and/or triple bond. However, an alicyclic system is not aromatic or heteroaromatic, i.e. does not have a system of conjugated double bonds/free electron pairs. Thus, the number of double and/or triple bonds maximally allowed in an alicyclic system is determined by the number of ring atoms, e.g. in a ring system with up to 5 ring atoms an alicyclic system comprises up to one double bond, in a ring system with 6 ring atoms the alicyclic system comprises up to two double bonds. Thus, the "cycloalkenyl" as defined below is a preferred embodiment of an alicyclic ring system. Alicyclic systems are optionally substituted.

The term "aryl" preferably refers to an aromatic monocyclic ring containing 6 carbon atoms, an aromatic bicyclic ring system containing 10 carbon atoms or an aromatic tricyclic ring system containing 14 carbon atoms. Examples are phenyl, naphtyl or anthracenyl. The aryl group is optionally substituted.

The term "aralkyl" refers to an alkyl moiety, which is substituted by aryl, wherein alkyl and aryl have the meaning as outlined above. An example is the benzyl radical. Preferably, in this context the alkyl chain comprises from 1 to 8 carbon atoms, i.e. 1, 2, 3, 4, 5, 6, 7, or 8, e.g. methyl, ethyl methyl, ethyl, propyl, iso-propyl, butyl, iso-butyl, sec-butenyl, tent-butyl, pentyl or hexyl, pentyl, octyl. The aralkyl group is optionally substituted at the alkyl and/or aryl part of the group.

The term "heteroaryl" preferably refers to a five or six-membered aromatic monocyclic ring wherein at least one of the carbon atoms are replaced by 1, 2, 3, or 4 (for the five membered ring) or 1, 2, 3, 4, or 5 (for the six membered ring) of the same or different heteroatoms, preferably selected from O, N and S; an aromatic bicyclic ring system wherein 1, 2, 3, 4, 5, or 6 carbon atoms of the 8, 9, 10, 11 or 12 carbon atoms have been replaced with the same or different heteroatoms, preferably selected from O, N and S; or an aromatic tricyclic ring system wherein 1, 2, 3, 4, 5, or 6 carbon atoms of the 13, 14, 15, or 16 carbon atoms have been replaced with the same or different heteroatoms, preferably selected from O, N and S. Examples are oxazolyl, isoxazolyl, 1,2,5-oxadiazolyl, 1,2,3-oxadiazolyl, pyrrolyl, imidazolyl, pyrazolyl, 1,2,3-triazolyl, thiazolyl, isothiazolyl, 1,2,3,-thiadiazolyl, 1,2,5-thiadiazolyl, pyridinyl, pyrimidinyl, pyrazinyl, 1,2,3-triazinyl, 1,2,4-triazinyl, 1,3,5-triazinyl, 1-benzofuranyl, 2-benzofuranyl, indolyl, isoindolyl, benzothiophenyl, 2-benzothiophenyl, 1H-indazolyl, benzimidazolyl, benzoxazolyl, indoxazinyl, 2,1-benzisoxazoyl, benzothiazolyl, 1,2-benzisothiazolyl, 2,1-benzisothiazolyl, benzotriazolyl, quinolinyl, isoquinolinyl, quinoxalinyl, quinazolinyl, 1,2,3-benzotriazinyl, or 1,2,4-benzotriazinyl.

The term "heteroaralkyl" refers to an alkyl moiety, which is substituted by heteroaryl, wherein alkyl and heteroaryl have the meaning as outlined above. An example is the 2-alklypyridinyl, 3-alkylpyridinyl, or 2-methylpyridinyl. Preferably, in this context the alkyl chain comprises from 1 to 8 carbon atoms, i.e. 1, 2, 3, 4, 5, 6, 7, or 8, e.g. methyl, ethyl methyl, ethyl, propyl, iso-propyl, butyl, iso-butyl, sec-butenyl, tent-butyl, pentyl or hexyl, pentyl, octyl. The heteroaralkyl group is optionally substituted at the alkyl and/or heteroaryl part of the group.

The terms "alkenyl" and "cycloalkenyl" refer to olefinic unsaturated carbon atoms containing chains or rings with one or more double bonds. Examples are propenyl and cyclohexenyl. Preferably, the alkenyl chain comprises from 2 to 8 carbon atoms, i.e. 2, 3, 4, 5, 6, 7, or 8, e.g. ethenyl, 1-propenyl, 2-propenyl, iso-propenyl, 1-butenyl, 2-butenyl, 3-butenyl, iso-butenyl, sec-butenyl, 1-pentenyl, 2-pentenyl, 3-pentenyl, 4-pentenyl, hexenyl, heptenyl, octenyl. The term also comprises $CH_2$, i.e. methenyl, if the substituent is directly bonded via the double bond. Preferably the cycloalkenyl ring comprises from 3 to 14 carbon atoms, i.e. 3, 4, 5, 6, 7, 8, 9, 10, 11, 12, 13 or 14, e.g. cyclopropenyl, cyclobutenyl, cyclopentenyl, cyclohexenyl, cycloheptenyl, cyclooctyl, cyclononenyl, cyclodecenyl, spiro[3,3]heptenyl, spiro[3,4]octenyl, spiro[4,3]octenyl, spiro[3,5]nonenyl, spiro[5,3]nonenyl, spiro[3,6]decenyl, spiro[6,3]decenyl, spiro[4,5]decenyl, spiro[5,4]decenyl, bicyclo[4.1.0]heptenyl, bicyclo[3.2.0]heptenyl, bicyclo[2.2.1]heptenyl, bicyclo[2.2.2]octenyl, bicyclo[5.1.0]octenyl, bicyclo[4.2.0]octenyl, hexahydro-pentalenyl, hexahydro-indenyl, octahydro-azulenyl, or octahydro-naphthalenyl.

The term "alkynyl" refers to unsaturated carbon atoms containing chains or rings with one or more triple bonds. An example is the propargyl radical. Preferably, the alkynyl chain comprises from 2 to 8 carbon atoms, i.e. 2, 3, 4, 5, 6, 7, or 8, e.g. ethynyl, 1-propynyl, 2-propynyl, 1-butynyl, 2-butynyl, 3-butynyl, 1-pentynyl, 2-pentynyl, 3-pentynyl, 4-pentynyl, hexynyl, pentynyl, octynyl.

As used herein "dimer acid", or "dimerized fatty acid" refers to dicarboxylic acids prepared by dimerizing unsaturated fatty acids. The fatty acids that are dimerized may thereby have the same number of carbon atoms or different number of carbon atoms. Preferably, unsaturated fatty acids obtained from tall oil are dimerized. A preferred dimer acid useful for the invention, e.g. useful to prepare the inventive ester is a dimer of C6-C22 monocarboxylic acids.

The term "optionally substituted" in each instance if not further specified refers to between 1 and 10 substituents, e.g. 1, 2, 3, 4, 5, 6, 7, 8, 9, or 10 substituents which are in each instance independently selected from the group consisting of halogen, in particular F, Cl, Br or I; —NO₂, —CN, —OR', —NR'R", —(CO)OR', —(CO)OR'", —(CO)NR'R", —NR-'COR"", —NR'COR', —NR"CONR'R", —NR"SO₂A, —COR'"; —SO₂NR'R", —OOCR'", —CR"R""OH, —R'"OH, and -E;

R' and R" is each independently selected from the group consisting of hydrogen, alkyl, alkenyl, alkynyl, -OE, cycloalkyl, heterocycloalkyl, aryl, heteroaryl, and aralkyl or together form a heteroaryl, or heterocycloalkyl; optionally substituted; R'" and R"" is each independently selected from the group consisting of alkyl, alkenyl, alkynyl, cycloalkyl, heterocycloalkyl, alkoxy, aryl, aralkyl, heteroaryl, and —NR'R";

E is selected from the group consisting of alkyl, alkenyl, cycloalkyl, alkoxy, alkoxyalkyl, heterocycloalkyl, an alicyclic system, aryl and heteroaryl; optionally substituted;

If two or more radicals can be selected independently from each other, then the term "independently" means that the radicals may be the same or may be different.

As used herein the term "about" in the context of a numerical value preferably means a deviation of +/−5% of said value.

The present invention provides novel additives for well treatment fluids. It was unexpectedly found that the additives have good viscosifying-properties and are unexpectedly also less toxic than generic additives. It is also expected that the inventive additives have good anti-corrosive properties.

Thus, in a first aspect the invention provides a well treatment fluid comprising
(i) an optionally substituted ester obtainable by reacting
(a) a polycarboxylic acid with
(b) a hydroxy monocarboxylic acid; and
(ii) water and/or an organic phase.

The ester in the well treatment fluid of the invention preferably comprises at least one free carboxylic acid group and most preferably comprises at least two free carboxylic acid groups.

The ester (i) can be obtained utilizing conventional esterification procedures. This generally involves reacting a molar excess of the polycarboxylic acid with the hydroxy monocarboxylic acid at an elevated temperature while removing water. The reaction may be carried out by refluxing the reactants in an azeotroping solvent, such as toluene or xylene, to facilitate removal of water. Preferably, however, the reaction is carried out in the absence of solvents. Esterification catalysts may be used but are not necessary for the reaction. At the completion of the reaction the excess acid and (if present) any solvent can be separated from the ester by vacuum stripping or distillation. The ester product thus produced may be utilized as such or it may be alkali refined or otherwise treated to reduce the acid number, remove catalyst residue, reduce the ash content, etc.

In a preferred embodiment of the well treatment fluid according to the invention the organic phase comprises or consists of a compound selected from the group consisting of
(1) a carboxylic acid ester of formula: R'—COO—R" (I);
  where R' is a saturated or unsaturated, linear or branched C5 to C23 alkyl group and R" is a C1 to C22 alkyl group, which may be saturated or unsaturated, linear or branched;
(2) a linear or branched C8 to C30 olefin;
(3) a water-insoluble, symmetrical or nonsymmetrical ether of a monohydric alcohol and preferably of a C1 to C24 monohydric alcohol;
(4) a water-insoluble alcohol of formula: R'"—OH (II), where R'" is a saturated, unsaturated, linear or branched C6 to C24 alkyl group;
(5) a carbonic acid diester;
(6) a paraffin;
(7) an acetal;
(8) an α-olefin, an internal olefin, a poly-α-olefin, or combinations thereof; and
(9) diesel fuel.

Preferably said organic phase of the well treatment fluid of the invention has a viscosity of <50 m.P.s at 40° C. A suitable organic phase that can be used in the well treatment fluid of the invention may also be a crude or refined hydrocarbon or mineral oil conventionally used in the drilling arts, for example crude oil, gas oil, and the like. Other oils including turpentine, cotton seed oil, whale oil, tall oil, tall oil esters, linseed oil, and other animal or vegetable oils can be utilized as organic phase as well. A suitable vegetable oil is for example tall oil ester. The organic phase is preferably present in the well treatment fluid of the invention in the range of about 10 to 95 percent by volume of the well treatment fluid and more preferably in the range of about 95 to 75 percent by volume of the well treatment fluid.

As water mentioned in (ii) of the well treatment fluid of the invention any water can be used. This water can for example be distilled water, non-purified sweet water or brine. Preferably the water is present as a saturated calcium brine having a calcium chloride content of 300,000 to 350,000 ppm, although other brine solutions can be used. Water which can be present in the well treatment fluid of the invention is preferably present in the range from about 5 to as high as about 90 percent by volume of well treatment fluid. More preferably the water content in the well treatment fluid is about 5 to 25 volume percent based on the total volume of the well treatment fluid with the most preferred range being about 5 to 15 volume percent. A small amount of water is generally desirable. Thus, most preferably, the well treatment fluid of the invention comprises from about 1 vol. % to about 14 vol. % water based on the total volume of the well treatment fluid.

Preferably, the well treatment fluid of the invention is an emulsion comprising in (ii) water and said organic phase. If the well treatment fluid of the invention is an emulsion, the emulsion may be an oil-in-water or a water-in-oil emulsion. Preferably, the "well treatment fluid" of the invention is an oil-based drilling fluid and therefore a water-in-oil emulsion which comprises in total more organic phase than water. In another preferred embodiment the ratio between the organic phase and the water in the well treatment fluid of the invention is between 20/80 to 80/20 and most preferably about 70/30.

In a preferred embodiment of the well treatment fluid according to the invention said polycarboxylic acid (a) is a dicarboxylic acid and preferably an aliphatic dicarboxylic acid.

In a further preferred embodiment, said polycarboxylic acid (a) is a branched or unbranched, saturated or unsaturated polycarboxylic acid. More preferably, said polycarboxylic acid (a) is a C4 to C56 polycarboxylic acid and even more preferably a C8 to C36 polycarboxylic acid.

In a particularly preferred embodiment, said polycarboxylic acid (a) comprised in the well treatment fluid is a dicarboxylic acid having the following general structure:

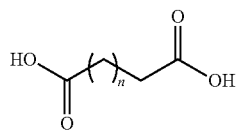

wherein n is between 1 and 36, more preferably between 3 and 18 and most preferably between 3 and 5 or said polycarboxylic acid (a) is a C8-C40 dimer acid.

In a further preferred embodiment said polycarboxylic acid (a) is selected from the group consisting of succinic acid, glutaric acid, adipic acid, pimelic acid, suberic acid, azelaic acid, sebacic acid, undecanedioic acid, dodecanedioic acid, 3,3-dimethylglutaric acid, terephthalic acid, isophthalic acid, cyclocarboxypropyloleicacid, naphthalenedicarboxylic acid, C8-dimer acid, C9-dimer acid, C10-dimer acid, C11-dimer acid, C12-dimer acid, C13-dimer acid, C14-dimer acid, C15-dimer acid, C16-dimer acid, C17-dimer acid, C18-dimer acid, C19-dimer acid, C20-dimer acid, C21-dimer acid, C22-dimer acid, C23-dimer acid, C24-dimer acid, C25-dimer acid, C26-dimer acid, C27-dimer acid, C28-dimer acid, C29-dimer acid, C30-dimer acid, C31-dimer acid, C32-dimer acid, C33-dimer acid, C34-dimer acid, C35-dimer acid, C36-dimer acid, C37-dimer acid, C38-dimer acid, C39-dimer acid, C40-dimer acid, and wherein said polycarboxylic acid (a) is most preferably azelaic acid or C21-dimer acid. Preferably, said polycarboxylic acid (a) is a dicarboxylic acid.

The ester (i) in the well treatment fluid according to the invention is also based on said hydroxy monocarboxylic acid (b). Preferably, said hydroxy monocarboxylic acid (b) is a C12 to C36 hydroxy monocarboxylic acid.

In a further preferred embodiment, said hydroxy monocarboxylic acid (b) is a branched, unbranched, saturated or unsaturated hydroxy monocarboxylic acid.

More preferably, said unsaturated hydroxy monocarboxylic acid (b) is selected from the group consisting of a hydroxy omega-3 fatty acid, a hydroxy omega-6 fatty acid, a hydroxy omega-7 fatty acid and a hydroxy omega-9 fatty acid.

If said hydroxy monocarboxylic acid (b) used to prepare the ester comprised in the well treatment fluid according to the invention is a hydroxy omega-9 fatty acid, then it is preferred that said hydroxy omega-9 fatty acid is selected from the group consisting of hydroxy-oleic acid, hydroxy elaidic acid, hydroxy gondoic acid, hydroxy mead acid, hydroxy erucic acid and hydroxy nervonic acid.

Preferably, said hydroxy monocarboxylic acid (b) used to make the ester is an aliphatic monohydroxy monocarboxylic acid and more preferably said hydroxy monocarboxylic acid (b) is ricinoleic acid or hydroxy stearic acid.

In a preferred embodiment of the well treatment fluid according to the invention said hydroxy monocarboxylic acid (b) is an unsaturated aliphatic monohydroxy monocarboxylic acid.

In a most preferred embodiment of the well treatment fluid according to the invention said ester is azelaic ricinoleate.

One unexpected advantage of the well treatment fluid according to the invention is that it has a reduced toxicity. Thus, it is preferred that said ester used in the well treatment fluid of the invention has an aerobic degradability of at least 30% after 28 days in seawater according to the Marine Bodis test as defined in ISO/TC 147/SC 5/WG 4N 141.

In a further preferred embodiment, the well treatment fluid of the invention further comprises
(iii) a viscosity modifier and/or
(iv) a corrosion inhibitor;
wherein said viscosity modifier (iii) and corrosion inhibitor (iv) are each different from said ester defined in (i).

Preferably, the mentioned viscosity modifier (iii) is selected from the group consisting of hydrogenated copolymers of styrene-butadiene, ethylene-propylene copolymers, polyisobutenes, hydrogenated styrene-isoprene polymers, hydrogenated isoprene polymers, polymethacrylates, polyacrylates, polyalkyl styrenes, alkenyl aryl conjugated diene copolymers, polyolefins, esters, functionalized polyolefins, ethylene-propylene copolymers functionalized with the reaction product of maleic anhydride and an amine, polymethacrylate functionalized with an amine, styrene-maleic anhydride copolymers reacted with an amine, polymethacrylate polymers, esterified polymers, esterified polymers of a vinyl aromatic monomer and an unsaturated carboxylic acid or derivative thereof, olefin copolymers, ethylene-propylene copolymer, polyisobutylene or mixtures thereof. The viscosity modifier (iii) is preferably present in the well treatment fluid in an amount of about 0 vol. % to 25 vol. %, in one embodiment in the range from about 0.25 vol. % to about 20 vol. % and in another embodiment in the range from about 0.5 vol. % to about 10 vol. % based on the total volume of the well treatment fluid.

The corrosion inhibitor (iv) that can be used according to the invention includes alkylated succinic acids and anhydrides derivatives thereof, organo phosphonates and the like. The corrosion inhibitor may be used for example in the range of about 0 vol. % to about 10 vol. %, and in one embodiment in the range from about 0.0005 vol. % to about 5 vol. % and in another embodiment in the range from about 0.0025 vol. % to about 2.5 vol. % based on the total volume of the well treatment fluid.

Preferably the well treatment fluid of the invention is a fluid selected from a drilling fluid, a spacer fluid, a fracturing fluid, an injection fluid, an acid stimulation fluid and a well cleanup fluid.

Due to its low toxicity the well treatment fluid of the invention is suitable for offshore well drilling operations. Thus, in a second aspect the invention provides the use of an ester as defined herein in the context of well treatment fluids of the invention as additive for a well treatment fluid and preferably for a well treatment fluid for offshore well drilling.

In a preferred embodiment of the use according to the invention the ester is used as viscosifier and/or corrosion inhibitor in said well treatment fluid. Preferably, the well treatment fluid is defined as described herein.

Various modifications and variations of the invention will be apparent to those skilled in the art without departing from the scope of the invention. Although the invention has been described in connection with specific preferred embodiments, it should be understood that the invention as claimed should not be unduly limited to such specific embodiments.

The following examples are merely illustrative of the present invention and should not be construed to limit the scope of the invention as indicated by the appended claims in any way.

EXAMPLES

Example 1

Production of Esters

Esters according to the invention including those shown in the table below can be prepared for example as outlined in the following for azelaic ricinoleate:

1 mol azelaic acid is mixed with 1 mol ricinoleic acid and heated under a nitrogen atmosphere to 180° C. The mixture is stirred for 2 hours under normal pressure at a temperature of 180-220° C. A vacuum of about 30,000 Pa (300mbar) is applied at a temperature of 220° C. The mixture is stirred at a temperature of about 220° C. under a vacuum of about 30,000 Pa (300mbar) for about 2.5 hours. The mixture is allowed to cool to room temperature under vacuum.

Example 2

Production of a Well Treatment Fluid

An oil based well treatment fluid was prepared as follows: the indicated amounts of the following ingredients are mixed using a Silverson Mixer (model L4RT) in the following order: synthetic paraffin, filtration control agent (a polymer: preferably Adapta by Halliburton), $Ca(OH)_2$, Amidoamin (Terradril EM 1122), Water, $CaCl_2*2H_2O$, $BaSO_4$, ball clay.

Next, either an ester of the invention (for example azelaic ricinoleate or an ester based on a C21 dimer acid and ricinoleic acid) or a conventional viscosifier (C36 dimer acid) is added to the mixture and to obtain the final emulsion a standard Hamilton Beach mixer was used, following manufacturer's instructions.

Example 3

Determining of Physical Properties of the Well Treatment Fluid

Next, the rheological characteristics including the fluids-plastic viscosity (PV), yield point (YP) and gel strength (gels 10"/10') after 10 seconds and 10 minutes were determined with a Fann SR 12/Model 35 rheometer (Fann). In addition to the rheological characteristics, the electrical stability was tested using a Model 23D Electrical Stability Tester, following manufacturer's instructions, in accordance with API recommended practice 13B-2, December 1991.

The well treatment fluid was also tested in a Roller Oven for the indicated times at the indicated temperatures (after hot rolling=AHR and before hot rolling=BHR as indicated in the Table). As roller oven, a Baroid Laboratory Roller Oven was used, following manufacturer's instructions.

The compounds were prepared and analyzed as described. The results are summarized in the following tables:

OIL BASED MUD EVALUATION

| Weight: g/cm$^2$ 11.0 lb/gal Salinity: 250,000 ppm | | Oil/Water ratio: 70/30 Date: Mix Method: Silverson @ 6000 rpm/HB |
|---|---|---|
| Synthetic paraffin | g | 146.3 |
| Filtration control agent (polymer) | g | 1-4 |
| Ca(OH)2 | g | 4-7 |
| Amidoamin (Terradril EM 1122) | g | 8-10 |
| Water | g | 77 |
| $CaCl_{2*2H2O}$ | g | 40 |
| BaSO4 | g | 156 |
| Ball clay | g | 15-30 |

-continued

| | | System 1 Blindwert | | System 2 Dimer C 36 | | System 3 Azelain-Ricinolat | | System 4 Dimer C 21-Ricinolat | |
|---|---|---|---|---|---|---|---|---|---|
| Dimer acid C 36 (Emery 2003) | g | — | | 2.5 | | — | | — | |
| Azelain ricinolate | g | — | | — | | 2.5 | | — | |
| Dimer C21-Ricinolat | g | — | | — | | — | | 2.5 | |
| System No.: | | 1 Blindwert | | 2 Dimer C 36 | | 3 Azelain-Ricinolat | | 4 Dimer C 21-Ricinolat | |
| | | BHR | AHR | BHR | AHR | BHR | AHR | BHR | AHR |
| Hours rolled/aged | h | | 16 | | 16 | | 16 | | 15 |
| Hot roll temp. | ° F. | | 150 | | 150 | | 150 | | 150 |
| | | | | Measuring temp. 50° C. | | | | | |
| Electrical stab. | V | 760 | 775 | 795 | 830 | 760 | 802 | 660 | 825 |
| 600 rpm | skt | 33 | 34 | 52 | 49 | 59 | 59 | 46 | 47 |
| 300 rpm | | 20 | 20 | 39 | 35 | 44 | 44 | 34 | 34 |
| 200 rpm | | 14 | 14 | 32 | 29 | 38 | 37 | 28 | 27 |
| 100 rpm | | 9 | 9 | 25 | 23 | 31 | 30 | 21 | 21 |
| 6 rpm | | 3 | 3 | 15 | 12 | 25 | 24 | 10 | 10 |
| 3 rpm | | 2 | 3 | 15 | 10 | 25 | 24 | 8 | 9 |
| PV | cP | 13 | 14 | 13 | 14 | 15 | 15 | 12 | 13 |
| YP | lb/100 ft² | 7 | 6 | 26 | 21 | 29 | 29 | 22 | 21 |
| Gels 10"/10' | lb/100 ft² | 2/2 | 2/3 | 16/19 | 11/15 | 20/25 | 22/25 | 9/10 | 10/11 |

Example 4

Testing Biological Degradability

The biodegradation rate was measured using the "Marine BODIS" method according to ISO TC/147/SC5/WG4, N 141 with a contact time of 28 days and a temperature of 20° C.±1° C.

This method uses natural seawater (salinity 34%-37%) with added mineral nutrients (8.5 g/l $KH_2PO_4$, 21.7 g/l $K_2HPO_4$, 29.92 g/l $Na_2HPO_4.2H_2O$, 0.5 g/l $NH_4Cl$, 31.84 $CaCl_2$, 22.5 g/l $MgSO_4.7H_2O$, 0.25 g/l $FeCl_3.6H_2O$, 0.4 g/l EDTA) and no inoculum was added in addition to the microorganisms already present in the seawater. The test vessels were closed glass bottles with a known volume of aqueous test mixture (66.6%) and air (33.3%). They were shaken continuously to assure steady state oxygen partitioning between the aqueous and gaseous phase. The degradation was followed by weekly measurements of the biochemical oxygen demand (BOD) in the aqueous phase for a 28-day period. The test vessels were re-aerated and resealed after measurement. The total oxygen uptake in the test flasks was calculated from the measured oxygen concentration divided by the saturation value at normal conditions and multiplied with the total oxygen content originally present in the aqueous and gaseous phases.

Three replicates were used for each test condition: test substance, controls, and insoluble reference substance. The total oxygen capacity of each test vessel was 26.64 mg oxygen. Sodium benzoate was used as the soluble reference substance (which is readily degradable) at a concentration of 20 mg of theoretical oxygen demand (ThOD) per test vessel.

An inert support medium, chromatography silica powder, was used to provide a large and controlled surface area for the poorly-soluble test substance and reference substance (olefin oil) The silica powder and test material were made into a homogenate and added to the test vessel before addition of the test medium. One gram of support medium containing 20 mg of ThOD of test substance or insoluble reference substance was used for each test vessel. The ThOD for the test substance was 0.34 mg oxygen/mg and the addition rate was 4 mg/test vessel.

The following controls were included: Background oxygen consumption in test medium, background oxygen consumption in test medium with clean silica powder.

Validity criteria stated: Temperature=19-21° C., soluble reference is >60% in 14 days, and cumulative blank oxygen consumption is <30% of oxygen initially available. The reference insoluble material is achieved 25-45% in 28 days.

The test results for the compounds of the invention and the reference compound (C36 dimer acid) were as follows:

C36 dimer acid (HA1174) biodegraded by 12% over 28 days and showed an inhibition of −1% to seawater bacteria. The test was extended for an additional 42 days to establish whether degradation was continuous after the test period. C36 Dimer acid achieved a maximum biodegradation of 22% during the 70 day study.

Azelaic ricinoleate (HA2091) biodegraded by 57% over 28 days and showed an inhibition of −14% to seawater bacteria. The test was extended for an additional 14 days to establish whether degradation was continuous after the test period. Azelaic ricinoleate biodegraded by 57% on day 42, which was the final day of study. Azelaic ricinoleate achieved a maximum biodegradation of 58% during the study.

In each experiment, the oxygen blank and reference oil degradation were within the required limits of acceptability, respectively. The soluble reference material, sodium benzoate, degraded by more than 60% in the first fourteen days, indicating that the seawater used in the test contained a satisfactory population of viable bacteria.

According to the above outlined results the polycarboxylic acid esters of the invention unexpectedly showed no significant disadvantages in toxicity and an improved biodegradability.

The invention claimed is:

1. A well treatment fluid comprising
   (i) an ester obtainable by reacting
      (a) a polycarboxylic acid with
      (b) a hydroxy monocarboxylic acid; and
   (ii) water and/or an organic phase
   wherein the well treatment fluid is an emulsion and said hydroxy monocarboxylic acid (b) is a C12 to C36 hydroxy monocarboxylic acid.

2. The well treatment fluid according to claim 1, wherein the organic phase comprises one or more compound selected from the group consisting of (1) a carboxylic acid ester of formula: R'—COO—R" (I); where R' is a saturated or unsaturated, linear or branched C5 to C23 alkyl group and R" is a C1 to C22 alkyl group, which may be saturated or unsaturated, linear or branched;
(2) a linear or branched C8 to C30 olefin;
(3) a water-insoluble, symmetrical or nonsymmetrical ether of a monohydric alcohol;
(4) a water-insoluble alcohol of formula: R'"—OH (II), where R'" is a saturated, unsaturated, linear or branched C8 to C24 alkyl group;
(5) a carbonic acid diester;
(6) a paraffin;
(7) an acetal;
(8) an α-olefin, an internal olefin, a poly-α-olefin, or combinations thereof; and
(9) diesel fuel.

3. The well treatment fluid according to claim 1, wherein said polycarboxylic acid (a) is a dicarboxylic acid.

4. The well treatment fluid according to claim 1, wherein said polycarboxylic acid (a) is a branched or unbranched, saturated or unsaturated polycarboxylic acid.

5. The well treatment fluid according to claim 1, wherein said polycarboxylic acid (a) is a C4 to C56 polycarboxylic acid and more preferably a C8 to C36 polycarboxylic acid.

6. The well treatment fluid according to claim 1, wherein said polycarboxylic acid (a) is a dicarboxylic acid having the following general structure:

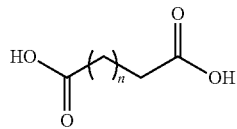

wherein n is between 1 and 36 and wherein n preferably is between 3 and 18, or a C6-C40 dimer acid.

7. The well treatment fluid according to claim 1, wherein said polycarboxylic acid (a) is selected from the group consisting of succinic acid, glutaric acid, adipic acid, pimelic acid, suberic acid, azelaic acid, sebacic acid, undecanedioic acid, dodecanedioic acid, 3,3-dimethylglutaric acid, terephthalic acid, isophthalic acid, cyclocarboxypyloleicacid, naphthalenedicarboxylic acid, C6-dimer acid, C7-dimer acid, C8-dimer acid, C9-dimer acid, C10-dimer acid, C11-dimer acid, C12-dimer acid, C13-dimer acid, C14-dimer acid, C15-dimer acid, C16-dimer acid, C17-dimer acid, C18-dimer acid, C19-dimer acid, C20-dimer acid, C21-dimer acid, C22-dimer acid, C23-dimer acid, C24-dimer acid, C25-dimer acid, C26-dimer acid, C27-dimer acid, C28-dimer acid, C29-dimer acid, C30-dimer acid, C31-dimer acid, C32-dimer acid, C33-dimer acid, C34-dimer acid, C35-dimer acid, C36-dimer acid, C37-dimer acid, C38-dimer acid, C39-dimer acid, C40-dimer acid, and wherein said polycarboxylic acid (a) is most preferably azelaic acid or C21-dimer acid.

8. The well treatment fluid according to claim 1, wherein said hydroxy monocarboxylic acid (b) is a branched, unbranched, saturated or unsaturated hydroxy monocarboxylic acid.

9. The well treatment fluid according to claim 8, wherein said unsaturated hydroxy monocarboxylic acid (b) is selected from the group consisting of a hydroxy omega-3 fatty acid, a hydroxy omega-6 fatty acid, a hydroxy omega-7 fatty acid and a hydroxy omega-9 fatty acid.

10. The well treatment fluid according to claim 9, wherein said hydroxy omega-9 fatty acid is selected from the group consisting of hydroxy-oleic acid, hydroxy elaidic acid, hydroxy gondoic acid, hydroxy mead acid, hydroxy erucic acid and hydroxy nervonic acid.

11. The well treatment fluid according to claim 1, wherein said hydroxy monocarboxylic acid (b) is an aliphatic monohydroxy monocarboxylic acid.

12. The well treatment fluid according to claim 11, wherein said hydroxy monocarboxylic acid (b) is ricinoleic acid or hydroxy stearic acid.

13. The well treatment fluid according to claim 1, wherein said hydroxy monocarboxylic acid (b) is an unsaturated aliphatic monohydroxy monocarboxylic acid.

14. The well treatment fluid according to claim 1, wherein said ester is azelaic ricinoleate.

15. The well treatment fluid according to claim 1, wherein said ester has an aerobic degradability of at least 30% after 28 days in seawater according to the Marine Bodis test as defined in ISO TC/147/SC5/WG4, N 141.

* * * * *